(12) United States Patent
Bozzolo (10) Patent No.: US 10,340,534 B2
(45) Date of Patent: Jul. 2, 2019

(54) REVISED FUEL CELL CYCLE FOR IN BLOCK REFORMING FUEL CELLS (71) Applicant: LG Fuel Cell Systems Inc., North Canton, OH (US)

(72) Inventor: Michele Bozzolo, Derby (GB)

(73) Assignee: LG FUEL CELL SYSTEMS INC., North Canton, OH (US)

(*) Notice: Subject to any disclaimer, the term of this patent is extended or adjusted under 35 U.S.C. 154(b) by 275 days.

(21) Appl. No.: 15/341,376

(22) Filed: Nov. 2, 2016

(65) Prior Publication Data
US 2018/0123150 A1    May 3, 2018

(51) Int. Cl.
H01M 8/0267    (2016.01)
H01M 8/0612    (2016.01)
H01M 8/0662    (2016.01)
H01M 8/04014   (2016.01)
H01M 8/04089   (2016.01)
H01M 8/04111   (2016.01)
H01M 8/24      (2016.01)
H01M 8/0258    (2016.01)
H01M 8/124     (2016.01)

(52) U.S. Cl.
CPC ..... *H01M 8/04022* (2013.01); *H01M 8/0258* (2013.01); *H01M 8/0267* (2013.01); *H01M 8/04097* (2013.01); *H01M 8/04111* (2013.01); *H01M 8/0618* (2013.01); *H01M 8/0662* (2013.01); *H01M 8/24* (2013.01); *H01M 2008/1293* (2013.01); *H01M 2250/20* (2013.01); *Y02E 60/525* (2013.01); *Y02T 90/32* (2013.01)

(58) Field of Classification Search
None
See application file for complete search history.

(56) References Cited

U.S. PATENT DOCUMENTS

| | | | |
|---|---|---|---|
| 6,391,484 B1 | 5/2002 | Keskula et al. | |
| 7,556,781 B2 | 7/2009 | Agnew et al. | |
| 7,625,528 B2 | 12/2009 | Agnew et al. | |
| 7,867,301 B2 | 1/2011 | Agnew et al. | |
| 8,062,802 B2 | 11/2011 | Devriendt et al. | |
| 8,247,124 B2 | 8/2012 | Agnew | |
| 2008/0090113 A1 | 4/2008 | Keefer et al. | |
| 2009/0042068 A1 | 2/2009 | Weingaertner et al. | |
| 2014/0216036 A1 | 8/2014 | Bozzolo et al. | |
| 2014/0272642 A1 | 9/2014 | Budge | |
| 2015/0030947 A1* | 1/2015 | Saunders | H01M 8/04022 429/415 |
| 2015/0096506 A1 | 4/2015 | Kelly et al. | |

FOREIGN PATENT DOCUMENTS

WO    2012013460 A1    2/2012

* cited by examiner

Primary Examiner — Maria Laios
(74) Attorney, Agent, or Firm — Dentons US LLP (57) ABSTRACT A fuel cell system having at least one fuel cell and a cathode loop for recycling a portion of an unused oxidant from the fuel cell for reuse in the same fuel cell is presented. The cathode loop may comprise an oxidant inlet manifold in the fuel cell configured to supply oxidant to the fuel cell, an oxidant exhaust manifold in the fuel cell configured to receive unused oxidant from said fuel cells, and a cathode ejector configured to receive oxidant from an oxidant source and the oxidant exhaust manifold and to supply oxidant to the oxidant inlet manifold, wherein a portion of said unused oxidant is supplied directly to said oxidant inlet manifold from said oxidant exhaust manifold via said cathode ejector.

17 Claims, 7 Drawing Sheets

REVISED FUEL CELL CYCLE FOR IN BLOCK REFORMING FUEL CELLS

FIELD

This disclosure generally relates to fuel cell systems. More specifically, this disclosure is related to fuel cell systems and methods which provide for revised fuel cell system cycles that are optimized for in-block reforming fuel cells.

BACKGROUND

A fuel cell is an electrochemical system in which a fuel (such as hydrogen) is reacted with an oxidant (such as oxygen) at high temperature to generate electricity. A fuel cell is typically supported by a system of components such as reformers, heat exchangers, ejectors, combustors, fuel and oxidant sources, and other components. For example, a source of unreformed fuel may be supplied via a fuel ejector to the fuel cell system reformer. The reformer may partially or completely reform the fuel by steam, dry, or other reforming method to produce a reformate that is supplied to the anodes of the fuel cell. The fuel cell may exhaust unused fuel from the anode and supply the unused fuel to either the suction of the fuel ejector or an auxiliary system.

To facilitate the reformation of the unreformed fuel, the fuel cell system may provide a heat input to the reformer by supplying the cathode exhaust, or other hot fluid, to the reformer. After transferring its heat into the reforming fuel, the cathode exhaust may be supplied to an auxiliary system, recycled back to the cathode inlet via an oxidant air ejector, or both.

While the temperature of the recycled and fresh oxidant supplied to the cathode will increase as it passes through the fuel cell stack, the heat input into the cathode flow may be insufficient to maintain the cathode loop in thermal equilibrium given the large heat input needed to support the reformation of the hydrocarbon fuel. To thermally balance the cathode loop, a heat exchanger may be introduced in the cathode loop, typically upstream of the cathode inlet. This heat exchanger may be supplied with the combustion products from the reaction of unused fuel and the cathode exhaust supplied to an auxiliary system. This reaction may occur in the heat exchanger or in a component, such as, e.g., a combustor, upstream of the heat exchanger.

The cathode loop is maintained in thermal equilibrium during normal operations. The heat generated within the fuel cell stack, the heat transferred into the fuel in the reformer, the cooling effect of the oxidant mixing at the cathode ejector, and the heat input from the heat exchanger will balance to maintain this thermal equilibrium; in fact, the heat exchanger upstream of the cathode inlet is sized for just such a purpose.

One type of fuel cell is the solid oxide fuel cell (SOFC). The basic components of a SOFC may include an anode, a cathode, a solid electrolyte, and an interconnect. The fuel may be supplied to the anode, and the oxidant may be supplied to the cathode of the fuel cell. At the cathode, electrons may ionize the oxidant. The electrolyte may comprise a material that allows the ionized oxidant to pass therethrough to the anode while simultaneously being impervious to the fluid fuel and oxidant. At the anode, the fuel is combined with the ionized oxidant in a reaction that releases electrons which are conducted back to the cathode through the interconnect. Heat generated from ohmic losses is removed from the fuel cell by either the anode or cathode exhaust flows or is radiated to the environment. The heat from these electrical loses could be used for the reformation of a hydrocarbon fuel within the fuel cell stack.

A SOFC may be structured, e.g., as a segment-in-series or in-plane series arrangement of individual cells. The oxidant is typically introduced at one end of the series of cells and flows over the remaining cells until reaching the cathode exhaust outlet. Each fuel cell transfers heat into the oxidant thereby raising its temperature and forming a temperature gradient that increases from the oxidant inlet to the exhaust. A temperature gradient may also develop in the fuel cell which increases from the oxidant inlet to the oxidant exhaust. These temperature gradients cause thermal stresses that may cause material degradation or failure of the fuel cell components or may reduce fuel cell performance.

The anode of a SOFC may be a mixed cermet comprising nickel and zirconia (such as, e.g., yttria stabilized zirconia (YSZ)) or nickel and ceria (such as, e.g., gadolinia dope ceria (GDC)). Nickel, and other materials, may function not only to support the chemical reaction between the fuel and the ionized oxidant but may have catalytic properties which allow the anode to reform a hydrocarbon fuel within the fuel cell. One method of reforming the hydrocarbon fuel is steam reforming of methane ($CH_4$), an endothermic reaction (Equation 1):

$$CH_4 + H_2O \rightarrow CO + 3H_2 \quad \Delta H° = 206.2 \text{ kJ/mole} \quad \text{(Equation 1)}$$

Alternative methods of reforming are also available. For example, the hydrocarbon fuel may be reformed by carbon dioxide reforming (also known as dry reforming) (Equation 2):

$$CO_2 + CH_4 \rightarrow 2H_2 + 2CO \quad \text{(Equation 2)}$$

The heat necessary for the reformation of methane could be supplied directly from the heat generated within the stack. This direct heat transfer may help cool the stack, reduce thermal stresses and improve overall stack performance.

Additionally, the direct heat transfer may remove or reduce the amount of heat needed for the reformation of a hydrocarbon fuel in the reformer. The removal of this large heat sink in the cathode loop may allow for a revised fuel cell cycle that improves fuel cell system efficiency while maintaining the cathode loop in thermal equilibrium.

There remains a need for revised fuel cell thermodynamic cycles for fuel cells that are configured for internal block reforming.

In accordance with some embodiments of the present disclosure, a fuel cell cycle is presented. The cycle may maintain the overall thermal balance of the cathode loop. The cycle may not require a heat transfer from the cathode exhaust into the reformer to facilitate a catalytic reformation of unreformed fuel. The fuel, either all or a portion thereof, may be reformed internally by either wet or dry reforming, wherein the heat necessary for the reformation of the unreformed hydrocarbon fuel is transferred from the heat generated with the fuel cell stack. An external reformer may be reduced in size when compared to reformers used in fuel cell cycles in which all or a majority of the fuel is reformed external to the fuel cell block. The heat exchanger upstream of the cathode inlet may be removed. In some embodiments, the fuel cell cycle may not contain an auxiliary loop.

In accordance with some embodiments of the present disclosure, a fuel cell system is provided. The fuel cell system may comprise a source of unreformed fuel and a source of oxidant. The system may further comprise a fuel cell stack, an anode ejector, a reformed, an auxiliary ejector, and a cathode ejector. The fuel cell stack may comprise a plurality of fuel cells each having an anode, cathode and an electrolyte. The fuel cell may be an SOFC. The stack may further comprise a fuel supply manifold configured to receive a reformate and unreformed fuel and to supply the reformate and unreformed fuel to the fuel cell, a fuel exhaust manifold configured to exhaust unused fuel from the fuel cell stack, an oxidant supply manifold configured to receive an oxidant and to supply the oxidant to the fuel cell and an oxidant exhaust manifold configured to exhaust the oxidant from the fuel cell stack. The anode ejector may be configured to receive unreformed fuel from the source of fuel and to receive a portion of the unused fuel exhausted from the fuel cell stack. The reformer may comprise a plurality of cold-side channels and a plurality of hot-side channels, a fuel supply manifold configured to receive fuel from the anode ejector and to supply the fuel to the plurality of cold-side channels, a fuel exhaust manifold configured to exhaust reformate from the plurality of cold-side channels and to supply the reformate to the fuel supply manifold of the fuel cell stack, an oxidant inlet manifold configured to receive a portion of the oxidant exhausted from the fuel cell stack and to supply the oxidant to the plurality of hot-side channels, and an oxidant exhaust manifold configured to exhaust the oxidant from the plurality of hot-side channels. The auxiliary ejector may be configured to receive a portion of the unused fuel exhausted from the fuel cell stack and to receive the oxidant exhausted from the plurality of hot channels. The cathode ejector may be configured to receive oxidant from a compressor and to receive oxidant exhausted from the oxidant exhaust manifold of the fuel cell stack and to supply oxidant to the oxidant inlet manifold of the fuel cell stack. The fuel cell system may further comprise a combustor configured to receive unused fuel and oxidant exhausted from the auxiliary ejector, a turbine configured to receive the exhaust from the combustor, and a compressor configured to receive oxidant from the oxidant source.

In accordance with some embodiments of the present disclosure, a solid oxide fuel cell system is provided. The system may comprise a fuel cell stack, a reformer, an anode loop, a cathode loop, and an auxiliary loop. The solid oxide fuel cell stack may comprise at least one solid oxide fuel cell, each solid oxide fuel cell comprising an anode, a cathode, and an electrolyte. The reformer may comprise hot- and cold-side channels. The anode loop may supply fuel and reformate to the anode of each solid oxide fuel cell, and may comprise a fuel inlet manifold in the fuel cell stack configured to supply fuel and reformate to the anode of each solid oxide fuel cell, a fuel exhaust manifold configured to receive unused fuel from the anode of each solid oxide fuel cell, a source of fuel, an anode ejector configured to receive fuel from the fuel source and the fuel exhaust manifold, the cold-side channels of said reformer configured to receive fuel from said anode ejector. The cathode loop may supply oxidant to the cathode of each solid oxide fuel cell, an may comprise an oxidant inlet manifold in the fuel cell stack configured to supply oxidant to the cathode of each solid oxide fuel cell, an oxidant exhaust manifold in the fuel cell stack configured to receive unused oxidant from each cathode of the solid oxide fuel cells, a source of oxidant, and a cathode ejector configured to receive oxidant from the oxidant source and the oxidant exhaust manifold and configured to supply oxidant to the oxidant inlet manifold. The auxiliary loop may provide for the combusting a portion of the unused fuel from said fuel exhaust manifold and a portion of the unused oxidant from the oxidant exhaust manifold, an may comprise the hot-side channels of the reformer configured to receive a portion of the unused oxidant from the oxidant exhaust manifold, an auxiliary ejector configured to receive the oxidant from the hot-side channels of the reformer, a portion of the oxidant from the oxidant source, and a portion of the unused fuel from the fuel exhaust manifold; and a combustor configured to receive the exhaust from said auxiliary ejector.

In accordance with some embodiments of the present disclosure, a fuel cell system having at least one fuel cell and a cathode loop for recycling a portion of an unused oxidant from the fuel cell for reuse in the same fuel cell is provided. The cathode loop may comprise an oxidant inlet manifold in the fuel cell configured to supply oxidant to the fuel cell, an oxidant exhaust manifold in the fuel cell configured to receive unused oxidant from said fuel cells, and a cathode ejector configured to receive oxidant from an oxidant source and the oxidant exhaust manifold and to supply oxidant to the oxidant inlet manifold, wherein a portion of said unused oxidant is supplied directly to said oxidant inlet manifold from said oxidant exhaust manifold via said cathode ejector.

These and many other advantages of the present subject matter will be readily apparent to one skilled in the art to which the disclosure pertains from a perusal of the claims, the appended drawings, and the following detail description of the embodiments.

Referring to the drawings, some aspects of non-limiting examples of a fuel cell system in accordance with an embodiment of the present disclosure are schematically depicted. In the drawings, various features, components and interrelationships therebetween of aspects of an embodiment of the present disclosure are depicted. However, the present disclosure is not limited to the particular embodiments presented and the components, features and, interrelationships therebetween as are illustrated in the drawings and described herein.

DETAILED DESCRIPTION

The objectives and advantages of the claimed subject matter will become apparent from the following detailed description of the preferred embodiments thereof in connection with the accompanying drawings.

Figure 1A:
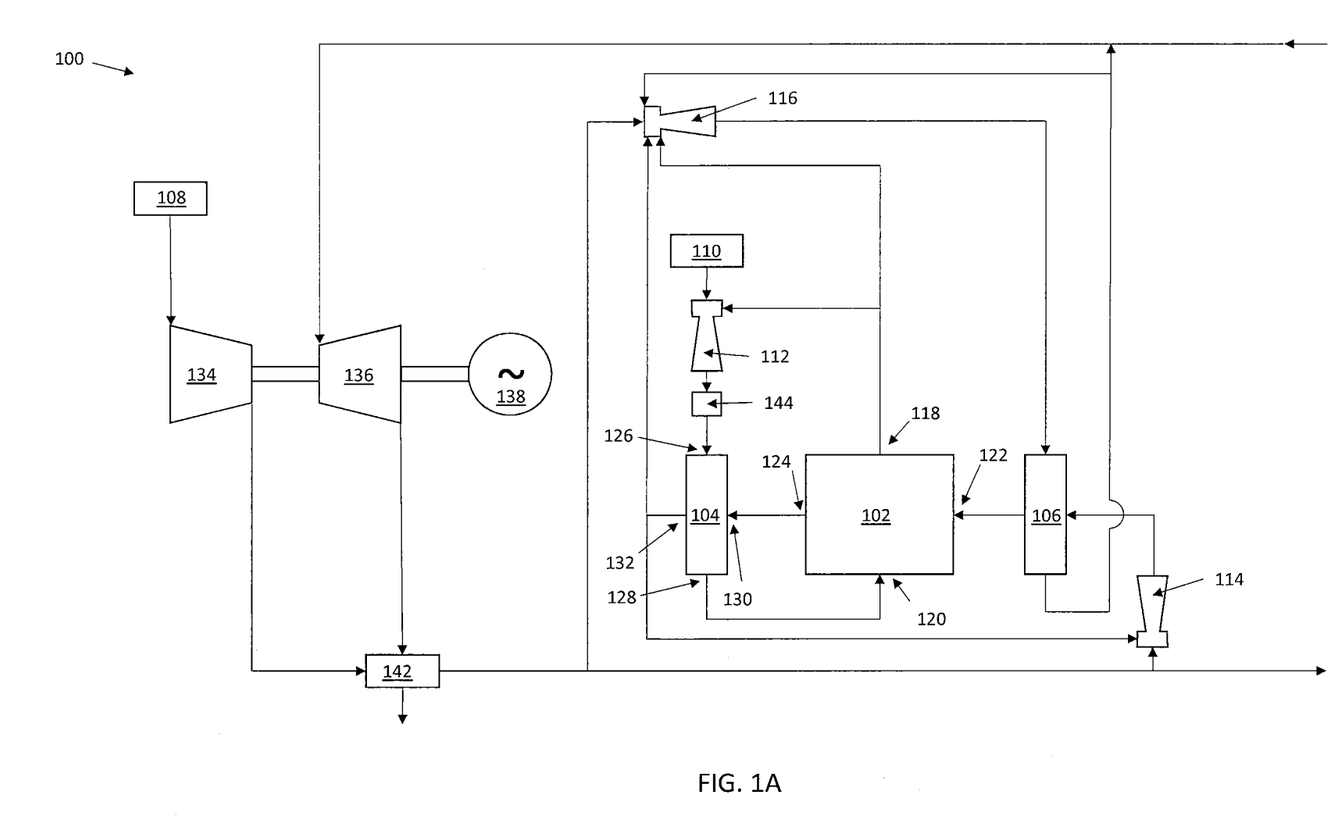
FIGS. 1A and 1B illustrate a fuel cell system.

FIG. 1A illustrates a fuel cell system 100. The system 100 may comprise a fuel cell stack 102, a reformer 104, a heat exchanger 106, a source of oxidant 108, a source of fuel 110, an anode ejector 112 (also referred to as a fuel ejector), a cathode ejector 114 (also referred to as an oxidant ejector) and an auxiliary ejector 116. The system 100 may further comprise auxiliary equipment and components such as compressor 134, turbine 136, generator 138, and recuperator 142.

The fuel cell stack 102 may comprise a plurality of individual fuel cells (not shown). The individual fuel cells may each comprise an anode, a cathode, and an electrolyte.

The fuel cell stack 102 may further comprise a fuel supply manifold 120 (also known as a fuel inlet manifold) that is configured to receive a reformate from the reformer 104. The fuel supply manifold 120 may also be configured to receive an unreformed fuel. The unreformed fuel may be fuel which passed through the reforming section of the reformer 104 but was not reformed, fuel which bypasses the reforming section of the reformer 104, or both. The fuel supply manifold 120 is further configured to supply the reformate, unreformed fuel, or both to the plurality of anodes of the fuel cell stack 102.

The fuel cell stack 102 may further comprise a fuel exhaust manifold 118 configured to exhaust unused fuel (e.g., reformate or unreformed fuel which is not reacted with the oxidant), fuel cell reaction products, or both from the fuel stack 102. The unused fuel may be supplied to the suction of the anode ejector 112, suction of the auxiliary ejector 116, other auxiliary equipment (not shown) such as, e.g., a combustor, vented to the environment, or any combination of these options.

The fuel cell stack 102 may further comprise an oxidant supply manifold 122 (which may be referred to as an oxidant inlet manifold) and an oxidant exhaust manifold 124. The oxidant supply manifold 122 is configured to receive an oxidant from the cathode ejector 114. The oxidant from the cathode ejector 114 may be combined with oxidant which is exhausted from the fuel cell stack 102. The oxidant may pass through the cold-side channels of heat exchanger 106 in which heat is transferred into the oxidant prior to it being received in the oxidant supply manifold 122. The oxidant supply manifold 122 is configured to deliver the oxidant to the plurality of cathodes in the fuel cell stack 102.

The oxidant exhaust manifold 124 is configured to exhaust the oxidant from the fuel cell stack 102 for delivery to the reformer 104 or some other component. In the reformer, the oxidant exhaust passes through the hot-side channels of the reformer 104 to affect a heat transfer into the unreformed fuel and unused fuel streams to aid in the reformation of the unreformed fuel. After exiting the reformer 104, the oxidant exhaust may be supplied to the suction side of cathode ejector 114, the suction side of auxiliary ejector 116, some other component (not shown) such as, e.g., a combustor, vented to the environment, or any combination of these options.

The oxidant exhaust which is supplied to the suction side of the cathode ejector 114 flows through a portion of the cathode loop. The cathode loop consists of the flow path from the cathode ejector 114, through the cold-side channels of the heat exchanger 106, into the oxidant supply manifold 122 from which the oxidant is supplied to the cathodes in the fuel cell stack 102, exhausted out the oxidant exhaust manifold 124, into the hot-side channels of the reformer 104 and back to the suction of the cathode ejector 114. As can be seen, the cathode loop is not a closed system because oxidant is allowed to enter the loop from oxidant supply 108 and to exit the loop to the suction of ejector 116 (or some other component). Additionally, a portion of the oxidant is ionized and diffused through the fuel cell electrolyte.

The reformer 104 may comprise a plurality of cold channels and a plurality of hot channels (not shown). The reformer 104 may further comprise a fuel supply manifold 126, a fuel exhaust manifold 128, an oxidant inlet manifold 130, and an oxidant exhaust manifold 132. The fuel supply manifold 126 is configured to receive fuel from the anode ejector 112 and to supply fuel to the cold side channels of the reformer 104. The cold side channels may comprise a catalyst to reform the fuel. The fuel exhaust manifold 128 is configured to exhaust a reformate from the plurality of cold side channels and to supply the reformate to the fuel supply manifold 120 of the fuel stack 102. The oxidant inlet manifold 130 is configured to receive the oxidant exhausted from the exhaust manifold 124 of the fuel stack 102 and to supply the exhausted oxidant to the hot side channels of the reformer 104. The exhausted oxidant will transfer its heat to the fuel in the plurality of cold-side channels to aid in the catalytic conversion of the unreformed fuel. The oxidant then flows to an oxidant exhaust manifold 132 where the oxidant may be removed from the reformer 104 and sent either to the suction side of the of the cathode ejector 114, auxiliary ejector 116, some other component, exhausted to the atmosphere, or any combination of these options.

Prior to flowing into the oxidant supply manifold 122, the oxidant may flow through the cold-side channels of heat exchanger 106. The hot side channels of heat exchanger 106 may be supplied with a source of hot fluid such as an exhaust from the anode, exhaust from the cathode, or other warm fluid. The warm fluid may be combustion products from a combustor that may be integrated into the auxiliary ejector 116 and combusts a portion of the unused fuel exhausted from the anodes of stack, the unused oxidant exhausted from the cathode side of the fuel cell stack 102, oxidant from the compressor 134, or a combination of these fluids. After passing through the hot side channels, the warm fluid may be supplied to the suction side of the auxiliary ejector 116 or may be vented to from the system.

The combustor (which may be integral to the auxiliary ejector 116) may also be supplied with fresh oxidant which may provide the energy used to power auxiliary ejector 116. The auxiliary ejector 116 may draw in a portion of the unused fuel from the fuel exhaust manifold 118, a portion of the oxidant from the oxidant exhaust manifold 132, and may also draw in the combustion gases after those gases pass through the heat exchanger 106.

The anode ejector 112 is configured to receive unreformed fuel from the source of unreformed fuel 110 and to supply it to the fuel supply manifold 126 of the reformer 104. The anode ejector 112 may also draw in a portion of the unused fuel exhausted from the fuel exhaust manifold 118.

In some embodiments, the portion of the fuel cell system 100 may be called an anode loop. This loop may comprise the fuel inlet manifold 120, the fuel exhaust manifold 118, the anode ejector 112, and the cold-side channels of the reformer 104. In some embodiments the loop may further comprise the pre-reformer 144 and the source of fuel 110.

The cathode ejector 114 is configured to receive fresh oxidant from the source of oxidant 108, and may be further configured to receive a portion of the unused oxidant exhausted from the oxidant exhaust manifold 132 of reformer 104. The cathode ejector 114 supplies the oxidant to the hot-side channels of heat exchanger 106.

The source of unreformed fuel 110 may be a source of hydrocarbon or other type of fuel. The source of oxidant 108 may be storage tanks filled with an oxidant such as, e.g., pure oxygen, atmospheric air, or other oxidant source or a system designed to generate a supply of oxidant.

The fuel cell system may further comprise compressor 134, turbine 136, generator 138, and recuperator 142. The recuperator 142 may be supplied with oxidant from the compressor 134 to a set of cold-side channels therein and the exhaust of the turbine 136 to a set of hot-side channels. The recuperator 142 functions to transfer heat between the turbine 136 exhaust and the oxidant supplied by the compressor 134 The turbine 136 may receive the combustion products from, e.g., heat exchanger 106. These products may expand through the turbine 136 that drives the compressor 134 and generator 138. The turbine 136 exhaust may be exhausted to the atmosphere, and may be supplied to the recuperator 142 to effect a heat transfer therein prior to being exhausted to the atmosphere as shown in FIG. 1A. Generator 138 may supply additional electrical power. Compressor 134 may be disposed downstream from the supply of oxidant 108. The compressor 134 may draw-in and compress the oxidant which is used to drive the cathode ejector 114 and auxiliary ejector 116. In some embodiments, a recuperator may be supplied that transfers heat from the exhaust of the turbine 136 and the outlet of the compressor 134. This recuperator may be upstream of the cathode ejector 114 and the auxiliary ejector 116.

In some embodiments, the fuel cell system 100 may be one of a plurality of integrated fuel cell systems. As can be seen on the right hand side of FIG. 1A, the right-pointing arrow beneath the cathode ejector 114 may proceed toward another integrated fuel cell system to supply oxidant to the cathode ejector and auxiliary ejector of that system. In such an embodiment, the compressor 134 may provide compressed oxidant for the plurality of integrated fuel cell systems. Similarly, the exhaust from the heat exchanger 106, auxiliary ejector 116, or both may be supplied to a common exhaust header which feeds into turbine 136. In other embodiments, multiple turbines and compressors may be used among the plurality of integrated fuel cell systems.

Figure 1B:
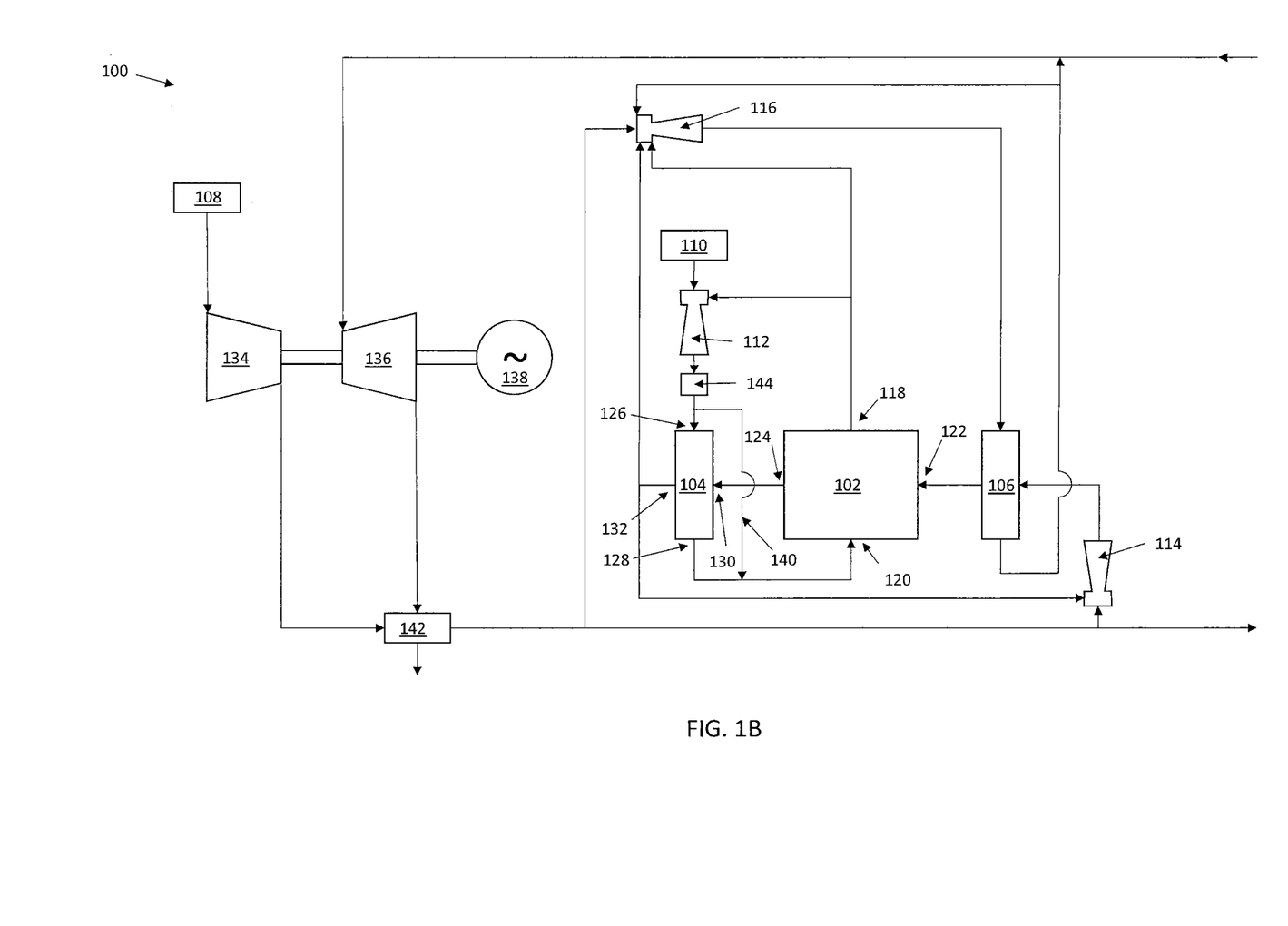

In some embodiments, fuel cell system 100 may further comprise a pre-reformer 144 disposed between the outlet of the anode ejector 112 and the reformer 104. In some embodiments, the pre-reformer may also be upstream of a bypass line (such as bypass line 140 as shown in FIG. 1B). The pre-reformer 144 functions to remove higher hydrocarbons from the stream of fuel from source 110, and any higher hydrocarbons that may exist in the anode exhaust recycled to the anode ejector 112. The pre-reformer 144 may be an adiabatic catalytic converter capable of removing the higher hydrocarbons with no heat input other than the heat from the fuel from source 110 and that recycled from the anode exhaust 118.

FIG. 1B illustrates a fuel cell system 100 which may be similar to that described above. However, the system 100 may include a bypass 140 which provides a flow path for unreformed fuel and the anode exhaust 118 flows to bypass the reformer 104. Bypass 140 may be referred to as a bypass line or duct. The bypass may aide in controlling the amount of internal reforming which may occur in stack 102. The stack 102 may be configured for dry or wet reforming.

In accordance with some embodiments, between 10 and 90 percent of the fuel from source 110 may bypass the reformer 104 via bypass duct 140. In some embodiments, between 20 and 70 percent of the fuel from source 110 may bypass the reformer 104 via bypass duct 140. In some embodiments, between 25 and 50 percent of the fuel from source 110 may bypass the reformer 104 via bypass duct 140.

In accordance with some embodiments, the fuel cell stack 102 and system 100 may be configured for internal reforming such that a substantial portion, or substantially all of the fuel from the source of unreformed fuel 110 is reformed within the fuel cell stack. The internal reforming may be dry or wet reforming. With some or all of fuel reforming occurring in the fuel cell stack 102, the system may not require a reformer external to the fuel cell stack, or may require a smaller reformer.

Figure 2A:
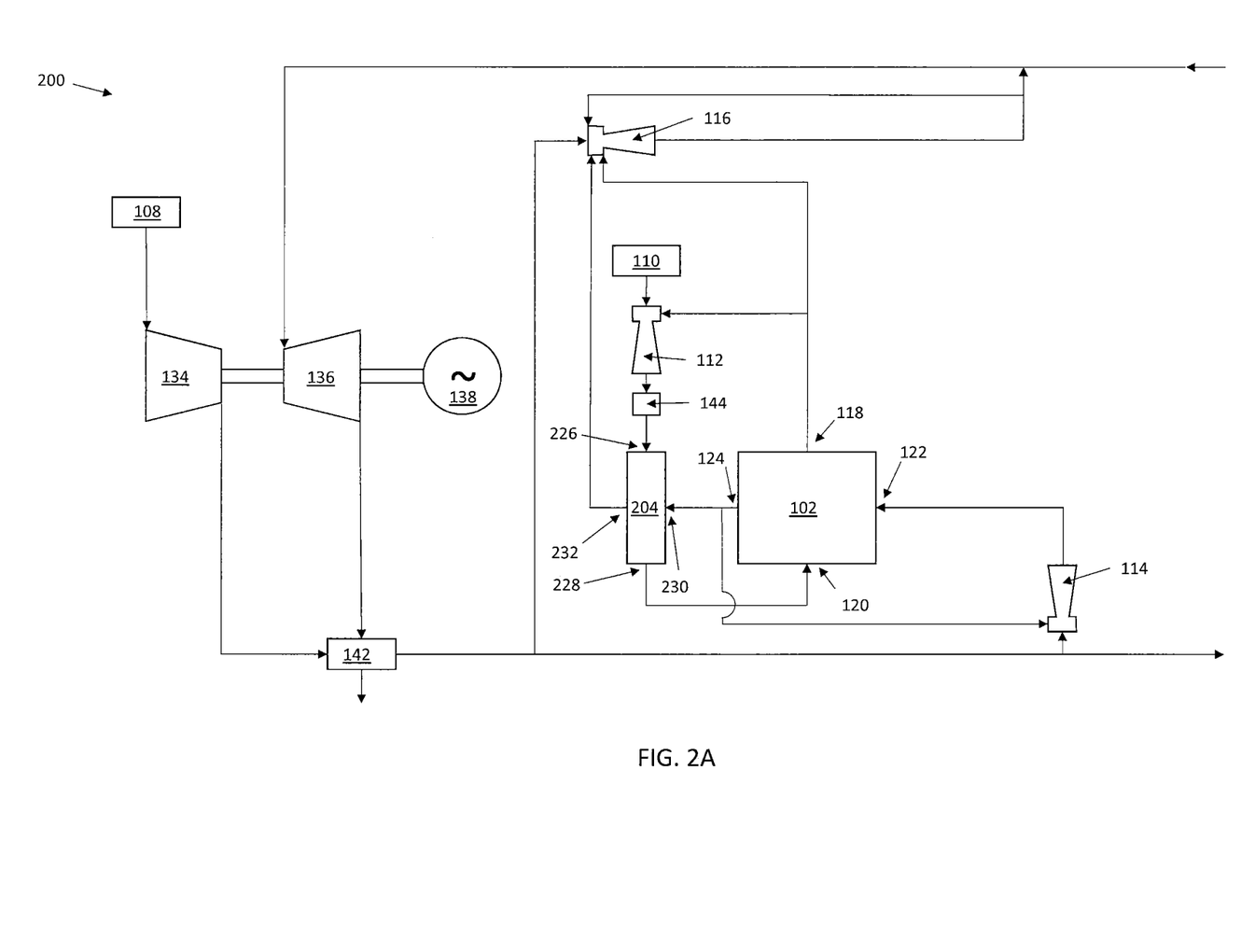
FIGS. 2A and 2B illustrates a fuel cell system in accordance with some embodiments of the present disclosure.

With reference to FIG. 2A, a fuel cell system 200 in accordance with some embodiments of the present disclosure is provided. The fuel cell system 200 comprises a fuel cell stack 102, component 204, a source of oxidant 108, a source of unreformed fuel 110, an anode ejector 112, a cathode ejector 114, and an auxiliary ejector 116. The system 200 may further comprise a compressor 134, turbine 136, generator 138, and recuperator 142. Components with like numbers may be similar to those as described above.

In accordance with some embodiments, the fuel cell stack 102 and system 200 may be configured for internal reforming such that a substantial portion, or substantially all of the fuel from the source of unreformed fuel 110 is reformed within the fuel cell stack. The internal reforming may be dry or wet reforming. With some or all of fuel reforming occurring in the fuel cell stack 102, the system may not require a reformer external to the fuel cell stack, or may require a smaller reformer. In some embodiments, in block reforming of all or at least a portion of the fuel from source 110 facilitates moving the reformer 104 outside of the cathode loop. This removal of the reformer 104 may provide for the recycling of the unused oxidant exhausted from the oxidant exhaust manifold 124 to be returned to the oxidant 122 inlet of the fuel cell stack without passing through any heat exchanger.

Figure 2B:
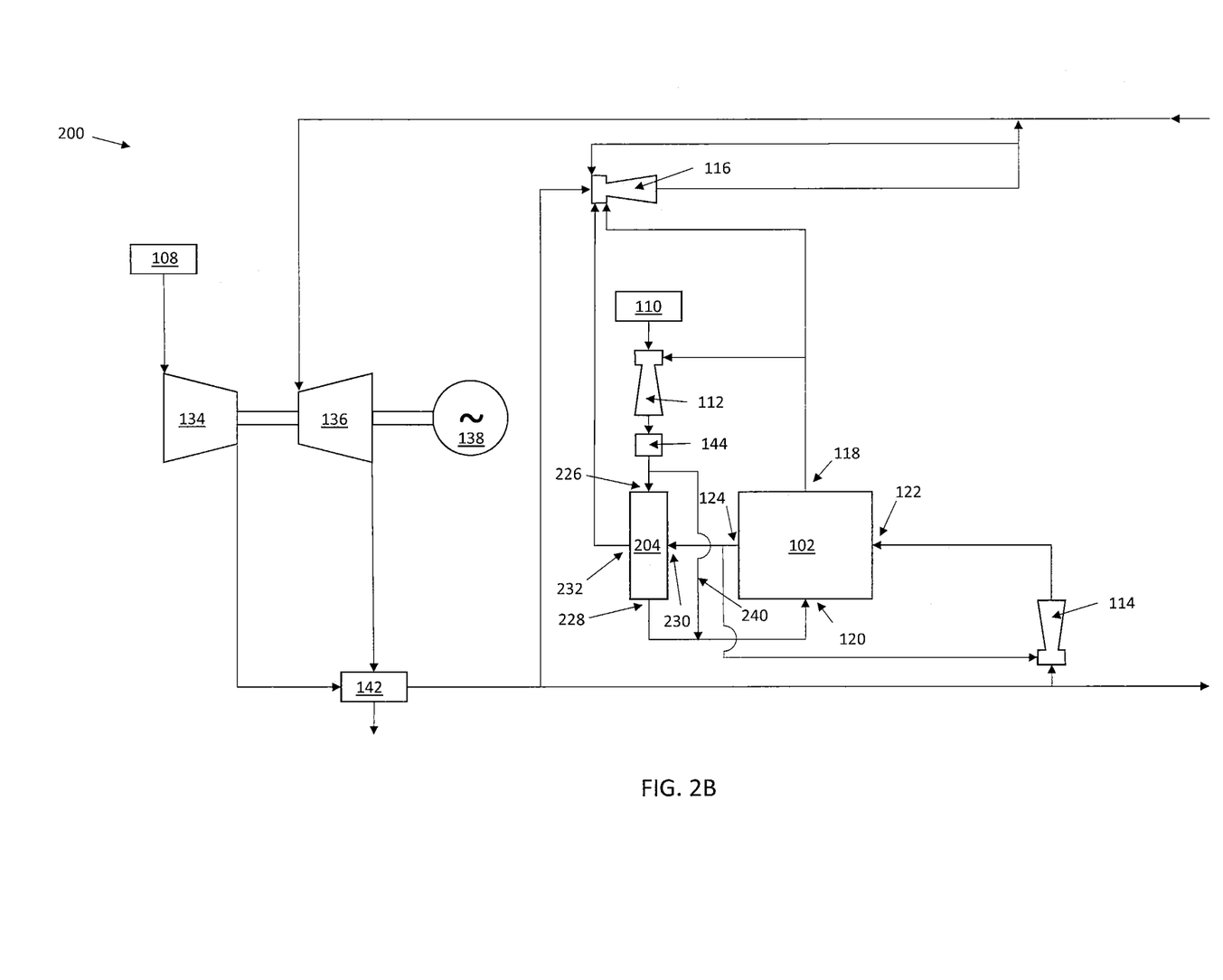
Figure 3:
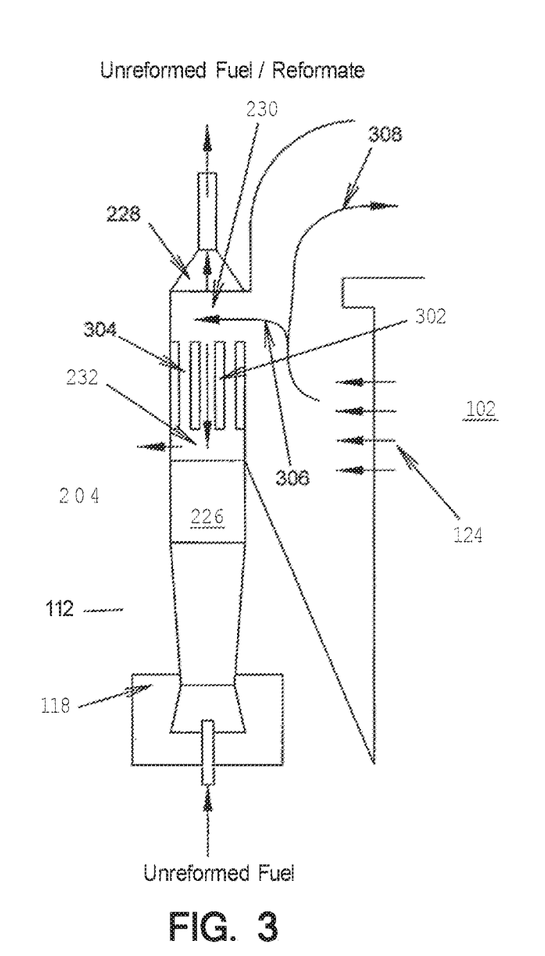
FIG. 3 illustrates some components of a fuel cell system in accordance with some embodiments of the present disclosure.

In some embodiments, the reformer 104 is replaced with a component 204, which may be a heat exchanger, such as a counter flow, cross flow, parallel, or other heat exchanger, or a reformer of reduced size. Component 204 is also shown in FIG. 3. With reference to FIG. 2A, FIG. 2B and FIG. 3, the component 204 may comprise a plurality of cold and hot side channels 302, 304, a fuel supply manifold 226, a fuel exhaust manifold 228, an oxidant inlet manifold 230, and an oxidant exhaust manifold 232. The fuel supply manifold 226 may be configured to receive a fuel from the anode ejector 112 and to supply the fuel to the cold-side channels 302. The cold side channels 302 may or may not contain a catalyst for reforming some or all of the fuel. The fuel is then exhausted from the exhaust manifold 228 that removes the fuel from the plurality of cold channels and supplies the reformed or unreformed fuel to the fuel supply manifold 120 of the fuel stack 102. The oxidant inlet manifold 230 is configured to receive a portion of the oxidant exhausted from the oxidant exhaust manifold 124 and to supply this oxidant to hot side channels 304. The oxidant exhaust manifold 232 is configured to supply the oxidant to the suction of the auxiliary ejector 116, some other component such as, e.g., a combustor (not shown), or vented.

With the introduction of in block reforming in the fuel cell stack 102, there is a reduction in the need for the hot-channel flow of oxidant (e.g. cathode exhaust) in component 204, allowing for a substantial reduction in size of component 204 when compared to reformer 104. Additionally, component 204 may be placed further away from the fuel cell stack 102, and may not require a high a flow rate of cathode exhaust to facilitate any fuel reformation occurring in component 204

In some embodiments, the fuel supply manifold 226, or other component prior to the cold-side channels 302, may contain a pre-reforming section, allowing the adiabatic reforming of a portion of the unreformed fuel in component 204.

In some embodiments, the cathode loop may comprise the flow of oxidant from the cathode ejector 114 to oxidant supply manifold 122 of the fuel cell stack 102, out of the fuel cell stack 102 via the oxidant exhaust manifold 124 and return to the suction side of the cathode ejector 114. In some embodiments the cathode loop may be considered to include the source of oxidant 108 and the additional components shown between the oxidant source 108 and the fuel cell stack 102 as described herein. In some embodiments, a portion unused oxidant received at the exhaust manifold 124 may be directly supplied to the inlet manifold 122 via the air ejector.

The volumetric flow rate of the air existing the cathode loop toward component 204 may be between 10 and 33% of the air flowing through the cathode loop. In some embodiments, the volumetric flow rate of the cathode exhaust through the cathode loop is between 2 and 8 times greater than the flowrate of the cathode exhaust leaving the cathode loop to be supplied to the component 204. In some embodiments, the volumetric flow rate of the cathode exhaust through the cathode loop is between 4 and 7 times greater than the flowrate leaving the cathode loop to be supplied to the component 204. In some embodiments, no less than two-thirds of the unused oxidant from cathode exhaust may be recycled to the fuel cell stack oxidant inlet manifold 122.

One of ordinary skill will appreciate that the amount of cathode exhaust which is supplied to component 204 must be balance with the amount of fuel which is reformed in the component 204 to ensure that a sufficient amount of heat is exchanged in the component 204 to support the desired level of reformation within the component 204.

FIG. 2B illustrates a fuel cell system 200 which may be similar to that described above. However, the system 200 may include a bypass 240 which provides a flow path for unreformed fuel and the anode exhaust 118 flows to bypass around the component 204. The bypass 240 may aide in controlling the amount of internal reforming which may occur in stack 102.

As shown in FIG. 3, a portion of the oxidant exhaust from oxidant exhaust manifold 124 is supplied to the oxidant inlet manifold 230 of component 204, as represented by arrow 306. The remaining portion of the oxidant exhaust is drawn back to the cathode ejector 114, as shown by arrow 308. In this configuration, the oxidant flowing through component 204 is oxidant which has left the cathode loop.

In accordance with some embodiments, no component is located between the cathode ejector 114 and the fuel cell stack 102 which is configured to transfer heat into the oxidant. This heat exchanger may be removed while the cathode loop is maintained in thermal equilibrium because the large heat-sink reformer 104 is removed from the cathode loop. This may also allow for a slight reduction in the cathode loop temperature, allowing for a small power increase from the fuel cell stack 102. Additionally, with the removal of heat exchanger 106, the need for the auxiliary loop (the loop supplied by auxiliary ejector 116) and a combustor may be removed. However, in some embodiments a small heat exchanger may be disposed upstream of the fuel cell stack 102 for warm-up of the fuel cell system 200.

Figure 4:
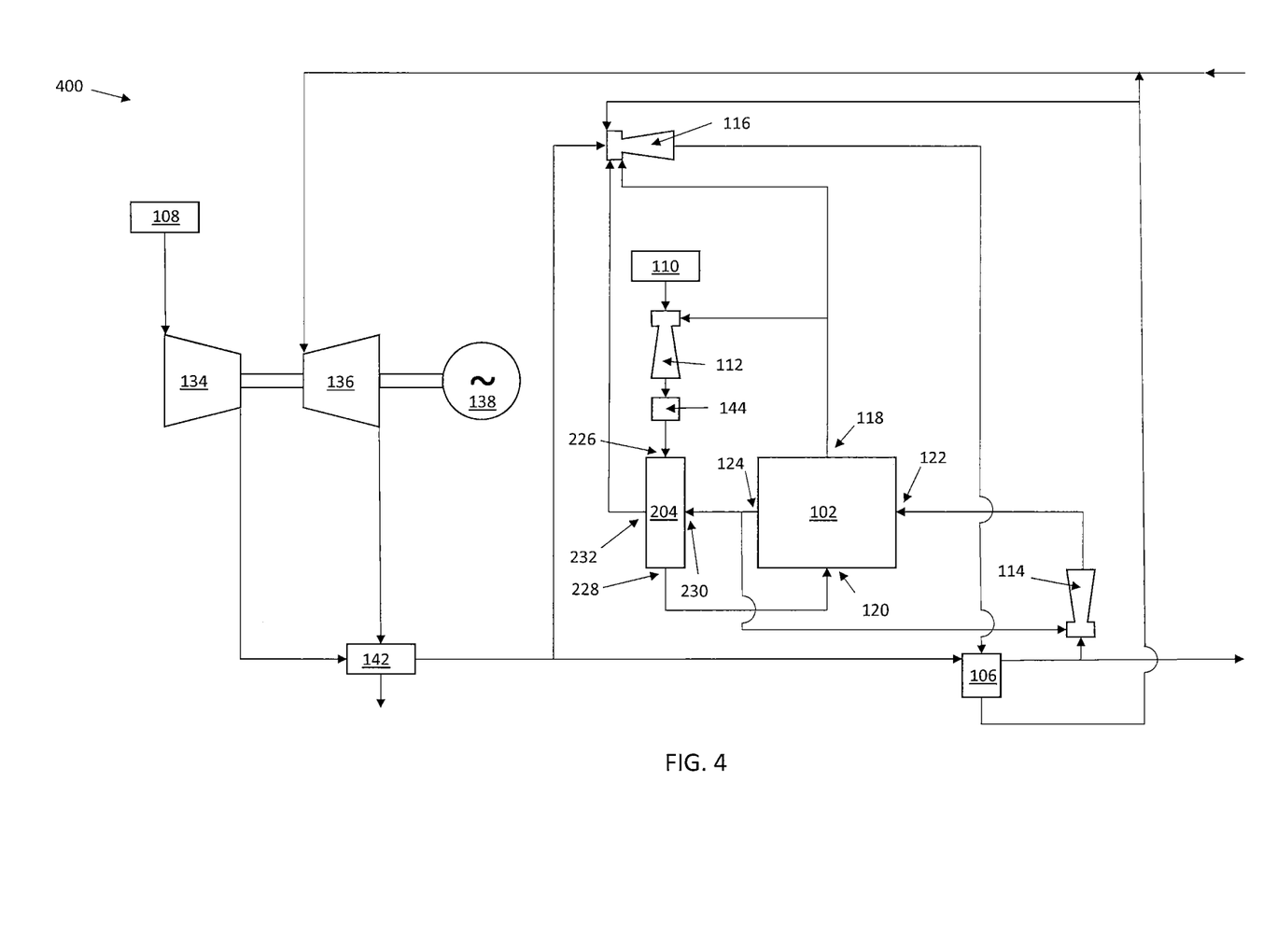
FIG. 4. illustrates a fuel cell system in accordance with some embodiments of the present disclosure.

In accordance with some embodiments of the present disclosure, a fuel cell system 400 is provided in FIG. 4. Components with like numbers may be similar to those as described above. The system 400 may comprise a heat exchanger 106 disposed upstream of cathode ejector 114. This heat exchanger may transfer heat into the flow of fresh oxidant.

Figure 5:
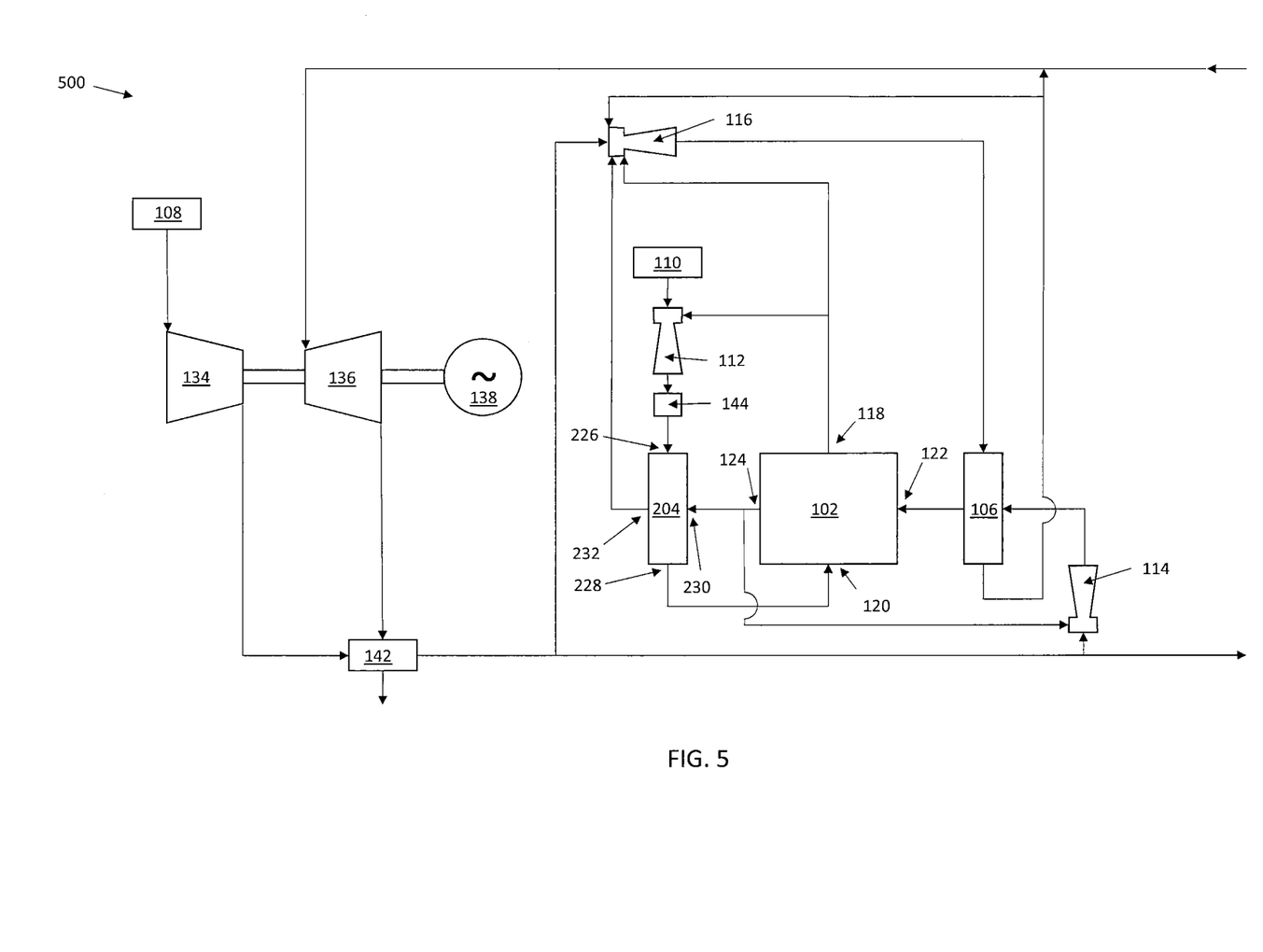
FIG. 5. illustrates a fuel cell system in accordance with some embodiments of the present disclosure.

In accordance with some embodiments of the present disclosure, a fuel cell system 500 is provided in FIG. 5. Components with like numbers may be similar to those as described above. The system 500 may comprise a heat exchanger 106 disposed downstream of cathode ejector 114 and upstream of the fuel cell stack 102. This heat exchanger may transfer heat into combined fresh oxidant and oxidant recycled in the cathode loop.

In accordance with some embodiments, the source of unreformed fuel 110, anode ejector 112, component 204, or a combination thereof is configured to supply an unreformed fuel to the fuel supply manifold 120 of the fuel cell stack 102. This unreformed fuel may join a reformate fuel prior to the fuel supply manifold 120.

In accordance with some embodiments, a method of balancing the heat transfer in a cathode loop during steady-state operations of a fuel cell system is provided. The fuel cell system may comprise a cathode loop for circulating an oxidant through the fuel cell stack where heat is transferred from the cathode loop in a reformer. Heat is transferred into the cathode loop in an inlet heat exchanger positioned between the cathode loop outlet of the reformer and a cathode loop inlet of the fuel cell stack. The method may comprise reforming the fuel in the fuel cells stack, removing the reformer from the cathode loop, and removing the inlet heat exchanger from the cathode loop. Only a portion of the oxidant exhausted from the fuel cell sack may be provided to the reformer.

While preferred embodiments of the present subject matter have been described, it is to be understood that the embodiments described are illustrative only and that the scope of the subject matter is to be defined solely by the appended claims when accorded a full range of equivalence, and the many variations and modifications naturally occurring to those of skill in the art from a perusal hereof.

I claim:

1. A solid oxide fuel cell system comprising:
   a source of unreformed fuel;
   a source of oxidant;
   a fuel cell stack comprising a plurality of solid oxide fuel cells, each solid oxide fuel cell comprising an anode, a cathode and an electrolyte, said fuel cell stack further comprising:
      a fuel supply manifold configured to receive a reformate and unreformed fuel and to supply the reformate and unreformed fuel to said plurality of anodes;
      a fuel exhaust manifold configured to exhaust unused fuel from said fuel cell stack;
      an oxidant supply manifold configured to receive an oxidant and to supply the oxidant to said plurality of cathodes; and
      an oxidant exhaust manifold configured to exhaust the oxidant from said fuel cell stack;
   an anode ejector configured to receive unreformed fuel from said source of fuel and to receive a portion of the unused fuel exhausted from said fuel cell stack;
   a reformer comprising a plurality of cold-side channels and a plurality of hot-side channels, said reformer further comprising:
      a fuel supply manifold configured to receive fuel from said anode ejector and to supply the fuel to said plurality of cold-side channels;
      a fuel exhaust manifold configured to exhaust reformate from said plurality of cold-side channels and to supply the reformate to said fuel supply manifold of said fuel cell stack;
      an oxidant inlet manifold configured to receive a portion of the oxidant exhausted from said fuel cell stack and to supply the oxidant to said plurality of hot-side channels; and
      an oxidant exhaust manifold configured to exhaust the oxidant from said plurality of hot-side channels;

an auxiliary ejector configured to receive a portion of the unused fuel exhausted from said fuel cell stack and to receive the oxidant exhausted from said plurality of hot channels;

a combustor configured to receive unused fuel and oxidant exhausted from the auxiliary ejector;

a turbine configured to receive the exhaust from the combustor;

a compressor configured to receive oxidant from said oxidant source; and a cathode ejector configured to receive oxidant from said compressor and to receive oxidant exhausted from said oxidant exhaust manifold of said fuel cell stack and to supply oxidant to said oxidant inlet manifold of said fuel cell stack.

2. The solid oxide fuel cell system of claim 1 further comprising a bypass duct configured to receive fuel exhausted from said anode ejector and to supply the fuel to the reformate exhausted from said cold-side channels upstream of said fuel supply manifold of said fuel cell stack.

3. The solid oxide fuel cell system of claim 2 wherein at least 10% of said fuel exhausted by said anode ejector passes through said bypass duct.

4. The solid oxide fuel cell system of claim 2 wherein between 10% and 90% of said fuel exhausted from said anode ejector passes through said bypass duct.

5. The solid oxide fuel cell system of claim 1 wherein the oxidant exhausted from said cathode ejector is supplied to said oxidant inlet manifold of said fuel cell stack without passing through a heat exchanger.

6. The solid oxide fuel cell system of claim 1 further comprising a heat exchanger comprising a plurality of cold-side channels and a plurality of hot-side channels, said heat exchanger being configured to receive oxidant from said cathode ejector in said cold-side channels and being configured to receive exhaust from said combustor in said hot-side channels.

7. The solid oxide fuel cell system of claim 1 further comprising a heat exchanger comprising a plurality of cold-side channels and a plurality of hot-side channels, said heat exchanger being configured to receive oxidant from said compressor in said cold-side channels and being configured to receive exhaust from said combustor in said hot-side channels.

8. The solid oxide fuel cell system of claim 1 wherein no more than 33% of the oxidant exhausted from said oxidant exhaust manifold of said fuel cell stack passes through said hot-side channels of said reformer.

9. The solid oxide fuel cell system of claim 1 wherein between 10% and 33% of the oxidant exhausted from said oxidant exhaust manifold of said fuel cell stack passes through said hot-side channels of said reformer.

10. The solid oxide fuel cell system of claim 1 further comprising a heat exchanger comprising a plurality of cold-side channels and a plurality of hot-side channels, said heat exchanger being configured to receive oxidant from said compressor in said cold-side channels and being configured to receive exhaust from said turbine in said hot-side channels.

11. A solid oxide fuel cell system comprising:
a solid oxide fuel cell stack comprising at least one solid oxide fuel cell, each solid oxide fuel cell comprising an anode, a cathode, and an electrolyte;
a reformer comprising cold-side channels and hot-side channels;

an anode loop for supplying fuel and reformate to the anode of each solid oxide fuel cell, said anode loop comprising:
a fuel inlet manifold in said fuel cell stack configured to supply fuel and reformate to the anode of each solid oxide fuel cell;
a fuel exhaust manifold configured to receive unused fuel from the anode of each solid oxide fuel cell;
a source of fuel;
an anode ejector configured to receive fuel from said fuel source and said fuel exhaust manifold;
the cold-side channels of said reformer configured to receive fuel from said anode ejector;

a cathode loop for supplying oxidant to the cathode of each solid oxide fuel cell, said cathode loop comprising:
an oxidant inlet manifold in said fuel cell stack configured to supply oxidant to the cathode of each solid oxide fuel cell;
an oxidant exhaust manifold in said fuel cell stack configured to receive unused oxidant from each cathode of said solid oxide fuel cells;
a source of oxidant;
a cathode ejector configured to receive oxidant from said oxidant source and said oxidant exhaust manifold and configured to supply oxidant to said oxidant inlet manifold; and an auxiliary loop for combusting a portion of the unused fuel from said fuel exhaust manifold and a portion of the unused oxidant from said oxidant exhaust manifold, said auxiliary loop comprising:
the hot-side channels of said reformer configured to receive a portion of the unused oxidant from said oxidant exhaust manifold;
an auxiliary ejector configured to receive the oxidant from the hot-side channels of said reformer, a portion of the oxidant from said oxidant source, and a portion of the unused fuel from said fuel exhaust manifold; and
a combustor configured to receive the exhaust from said auxiliary ejector.

12. The solid oxide fuel cell system of claim 11 further comprising a compressor configured to receive oxidant from said oxidant source.

13. The solid oxide fuel cell system of claim 11 further comprising a turbine configured to receive the exhaust from said combustor.

14. The solid oxide fuel cell system of claim 13 further comprising a heat exchanger having hot-side channels and cold-side channels, wherein said cold-side channels of said heat exchanger are disposed in said cathode loop and are configured to receive oxidant from said oxidant source and to supply oxidant to said cathode ejector, and wherein said hot-side channels of said heat exchanger are configured to receive an exhaust from said turbine.

15. The solid oxide fuel cell system of claim 11 further comprising a heat exchanger having hot-side channels and cold-side channels, wherein said cold-side channels of said heat exchanger are disposed in said cathode loop and are configured to receive oxidant from said oxidant source and to supply oxidant to said cathode ejector, and wherein said hot-side channels of said heat exchanger are disposed in said auxiliary loop and are configured to receive an exhaust from said combustor.

16. The solid oxide fuel cell system of claim 11 further comprising a heat exchanger having hot-side channels and cold-side channels, wherein said cold-side channels of said heat exchanger are disposed in said cathode loop and are configured to receive oxidant from said cathode ejector and supply oxidant to said oxidant inlet manifold, and wherein said hot-side channels of said heat exchanger are disposed in said auxiliary loop and are configured to receive an exhaust from said combustor.

17. The solid oxide fuel cell system of claim 11, wherein said anode loop further comprises a bypass line configured to bypass a portion of fuel supplied by said anode ejector around said cold-side channels of said reformer.

* * * * *